Aug. 22, 1967  J. A. PAGE  3,337,272
AERATION UNIT
Filed Feb. 1, 1966  2 Sheets-Sheet 1
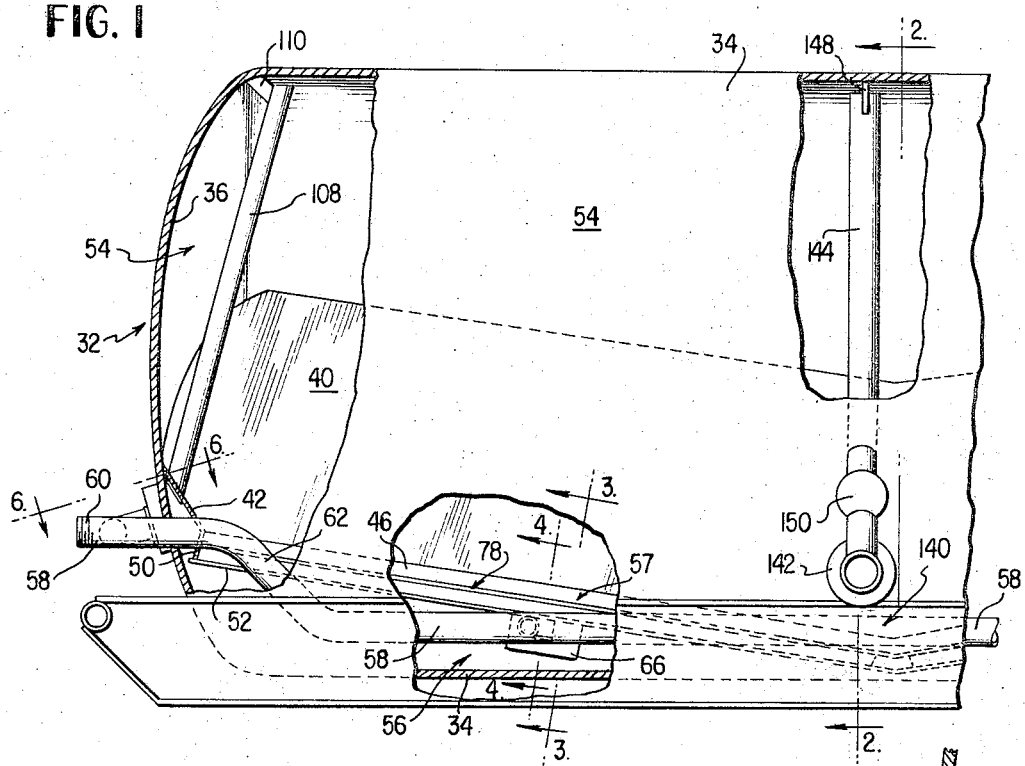
FIG. 1
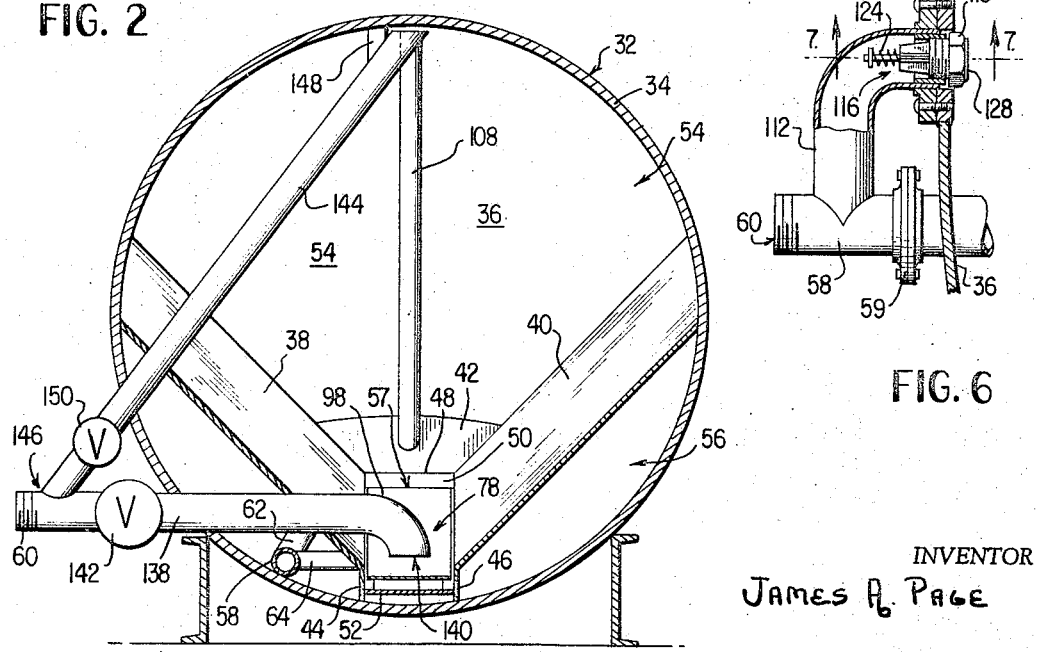
FIG. 2
FIG. 6
INVENTOR
JAMES A. PAGE
BY Le Blanc & Shur
ATTORNEYS Aug. 22, 1967  J. A. PAGE  3,337,272
AERATION UNIT
Filed Feb. 1, 1966  2 Sheets-Sheet 2

INVENTOR
JAMES A. PAGE

BY  Le Blanc & Shur

ATTORNEYS

United States Patent Office 3,337,272
Patented Aug. 22, 1967

3,337,272
AERATION UNIT
James A. Page, Baton Rouge, La., assignor to Delta Southern Co., Div. of Southwest Fabrication and Welding Co., Inc., Houston, Tex., a corporation of Texas
Filed Feb. 1, 1966, Ser. No. 524,043
9 Claims. (Cl. 302—53)

ABSTRACT OF THE DISCLOSURE

A pumping tank for pulverulent material which includes a bottom wall and a plenum chamber on the underside of the bottom wall and communicating therewith by an aperture in such wall, including an air permeable material-type aeration unit which has a rigid lower portion forming a chamber beneath the air permeable material and which aeration unit is removably mounted on the upper side of the bottom wall. The chamber beneath the air permeable material and the lower portion of the aeration unit is in fluid tight communication with the aperture to the plenum chamber for receiving air therefrom. The aeration unit is held in position by means which is actuatable from within the tank so that the aeration unit may be both mounted and demounted from within the tank. The pumping unit may include pressure control valving for maintaining the pressure of air flowing through the plenum chamber within a predetermined maximum limit.

Background of the invention

This invention relates generally to pumping tanks for pulverulent material, and more particularly to novel aeration units or pads useful in pumping tanks for aerating the pulverulent material in order to fluidize the material and cause it to flow freely to facilitate pumping the material from the tank. This invention further relates to novel pressure-equalizing means useful with the aforementioned aeration units in pumping tanks.

Heretofore, aeration units or pads of the general character which are the subject matter of the invention were fixedly mounted, in pumping tanks, either on the bottom wall of the tank or at the bottom of so-called slope sheets mounted on the inside of the tank. The aeration pads previously used generally include an air chamber or plenum beneath the pad, with an inlet nipple mounted in the bottom wall of the plenum to supply air for the pad. Mounted across the top of the plenum is a pad of air-pervious material, the pad normally forming a portion of the bottom surface of the tank. The pulverulent material in the tank is thus in direct overlying engagement with the pad, whereby the air forced upwardly from the plenum through the pad by an air connection hose connected to the nipple acts to fluidize the material and cause it to slide if the unit is inclined, such units generally being referred to as "air slides."

While such units are satisfactory when used in the bottom wall of a tank when the bottom wall is in an accessible location, a number of difficulties are encountered when the bottom wall is not accessible, or when the unit is mounted on an internal inclined sheet spaced from the bottom wall so that the air inlet is not accessible from the outside of the tank. A number of alternative arrangements were attempted to eliminate or at least alleviate the air connection and replacement difficulties which were encountered.

One proposed solution was to fasten the fabric of the pad directly to the adjacent slope sheet (or attachments thereto) with blind rivets and pressurize the entire area below the slope sheets and fabric. This was not satisfactory, as it was found that replacement of fabric was so difficult as to be economically prohibitive. In addition, this arrangement necessitated increasing the structural strength of the slope sheets to withstand the increased forces thereon. This too added to the cost involved. Other proposed solutions involved various means for providing access to the underside of the bottom of the slide to get at the nipple and air hose connection thereto. These arrangements also proved less than satisfactory, for a variety of reasons.

Summary of the invention

According to the present invention, it has now been found that these difficulties may be overcome through the use of a unique aeration pad mounting arrangement whereby entire units may be installed or removed from the inside of the vessel with no necessity for access to the air inlet conduiting.

It is an object of the instant invention to provide a novel and improved aeration unit for use in pumping tanks for pulverulent material.

It is another object of the present invention to provide an aeration unit of novel construction which may be removably mounted in a pumping tank for quick and easy installation and removal from the interior of the tank.

It is a further object of the present invention to provide an aeration unit of the character described including means for fixedly connecting an air hose or conduit to the underside of an inaccessible bottom of a floor in a pumping tank for airtight communication with the aeration unit.

It is another object of the present invention to provide an aeration unit of the character described which is simple of design and relatively inexpensive to construct, install and maintain.

It is a further object of the present invention to provide novel pressure-equalizing means for use with the aeration unit of the present invention.

It is also an object of the present invention to provide a pumping tank for pulverulent material including an improved aeration unit therein and air-flow conduit means for feeding compressed air or gas to the aeration unit, the conduit including novel pressure relief valve means therein for maintaining the air pressure at the aeration unit within certain prescribed limits.

Other objects and advantages will become apparent upon reference to the following specification, claims, and appended drawings wherein:

FIGURE 1 is a partial side elevational view of a pumping tank with parts of the side wall broken away to illustrate the aeration unit comprising the present invention;

FIGURE 2 is a vertical sectional view taken substantially on the plane of line 2—2 of FIGURE 1;

FIGURE 6 is a partial plan view, partially in section, taken substantially on the plane of line 6—6 of FIGURE 1;

Figure 8:
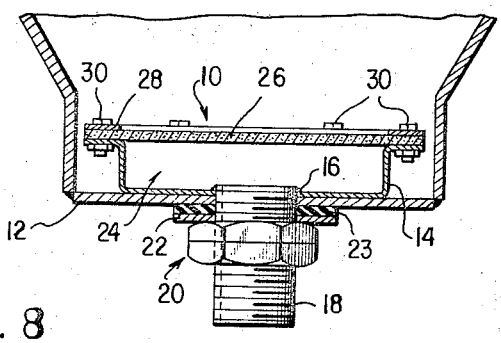
FIGURE 8 is a partial vertical sectional view of an aeration unit of the general type used prior to the present invention.

Referring now more particularly to the drawings, and specifically to FIGURE 8, an air slide previously in general use is illustrated and denoted by reference numeral 10, and is described below to provide a better appreciation of the novel and significant advances achieved by the present invention. The air slide 10 is illustrated as mounted on a bottom sheet 12 of a pumping tank. The air slide comprises a generally U-shaped channel 14 fixedly secured, as by weld 16, to a pipe nipple 18 which extends through a mounting hole in channel 14. The pipe nipple 18 is threaded for removably receiving an air supply hose (not illustrated) and includes suitable lock nuts 20, washer 22 and sealing gasket 23 for retaining the channel 14 on the sheet 12. An air plenum chamber 24 is formed by the channel 14 and an aeration pad 26 of suitable air-pervious material which is mounted over the open top of channel member 14 by means of a mounting gasket 28 and threaded fasteners 30.

While this arrangement is more or less satisfactory so long as there is free access to the nipple 18, it will be apparent that the device 10 is less than completely satisfactory when the underside of the sheet 12 is inaccessible, so that there is no access to the nipple 18 and lock nuts 20. Under such circumstances, the air slide 10 cannot be removed without first gaining access to the underside of the bottom sheet 12 to remove the lock nuts. This may be impossible as a practical matter.

Referring now to FIGURES 1 and 2 for a description of the instant invention, a pumping tank for pulverulent material is generally denoted by reference numeral 32. The tank 32 conventionally may be an elongate cylindrical tank having cylindrical wall 34 and end wall 36. Of course, it will be appreciated that FIGURE 1 illustrates only approximately one-half of the pumping tank, the other half being similar and including similar internal structural details.

Mounted in the tank 32 are side slope sheets 38 and 40 and an end slope sheet 42, the slope sheets being fixedly mounted in the tank (as, for example, by being welded therein) and sloping longitudinally and transversely downwardly toward the bottom center portion of the tank, as may be seen in FIGURES 1 and 2. The side slope sheets 38 and 40 and the end slope sheet 42 terminate short of the bottom of wall 34, and a pair of substantially vertical side closure walls 44 and 46 extend downwardly from the lower edges of slope sheets 38 and 40, respectively, to form the side walls of a trough 48 which extends longitudinally along the tank. An end closure wall 50 extends downwardly from the lower edge of the slope sheet 42 to form the end of trough 48, and a bottom wall 52 for the trough is mounted between the side walls 44 and 46 only a short distance below the lower edges of side slope sheets 38 and 40. Thus, it will be observed that the tank 32 is effectively divided into an upper chamber 54 above the slope sheets and trough and lower chambers 56 below the slope sheets and 57 in the trough, the upper chamber 54 and lower chambers 56 and 57 being fluid-shealed each from the other.

An air inlet conduit 58 is mounted in the end wall 36 of the tank, the conduit 58 having a threaded end 60 to which an air hose can be fastened for admitting air under pressure to the conduit. The conduit 58 extends into the tank under slope sheet 38, includes a downward bend (as indicated by reference numeral 62) and continues longitudinally through the tank. A side branch conduit 64 extends from conduit 58 at a substantially right angle thereto and extends through the side closure wall 44 below the bottom wall 52 of trough 48.

Figure 4:
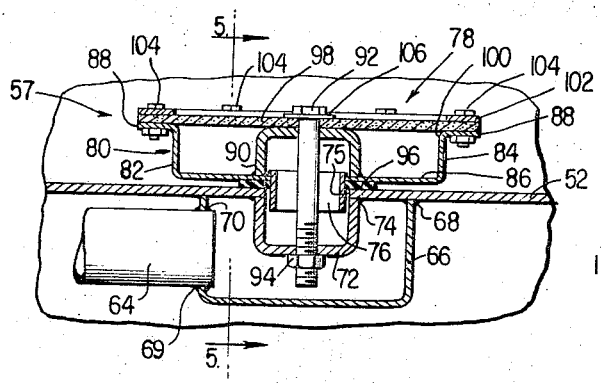
FIGURE 4 is an enlarged partial vertical sectional view taken substantially on the plane of line 4—4 of FIGURE 1.

Referring to FIGURE 4, a box-like enclosure 66 is fixedly mounted on the underside of wall 52, as by weld 68, the enclosure 66 being air sealed with respect to wall 52 and including an opening 69 in the side wall thereof. The branch conduit 64 is fixedly mounted in the opening 69, as by weld 70, and thus is air sealed in communication with the enclosure, the enclosure thereby constituting a plenum chamber 67 for receiving compressed air or gas from the conduits 58 and 64.

A U-shaped bracket 72 is mounted within enclosure 66 by a relatively weak weld 74 at the inner edge of the bracket and opening 75 in the bottom trough wall 52. Removably received within the opening 75 in wall 52 is an annular ring 76 which extends through wall 52 upwardly into the trough 48 and downwardly into enclosure 66. The ring 76 is welded to the bottom wall 86 of the aeration unit 78.

Figure 3:
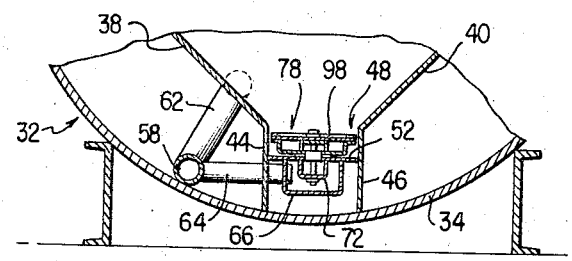
FIGURE 3 is an enlarged partial vertical sectional view taken substantially on the plane of line 3—3 of FIGURE 1.
Figure 5:
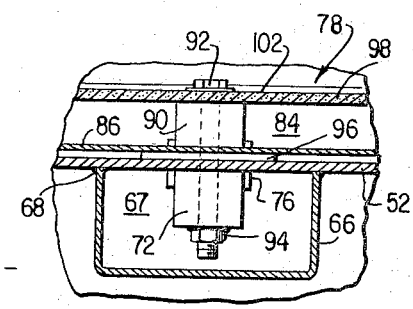
FIGURE 5 is a partial vertical sectional view taken substantially on the plane of line 5—5 of FIGURE 4.

An aeration unit, generally denoted by reference numeral 78 and best illustrated in FIGURES 3–5, is removably mounted in the trough 48, as will now be explained. The aeration unit 78 includes an elongate channel 80 of U-shaped cross section including upstanding side walls 82 and 84 and bottom wall 86. The side walls 82 and 84 each includes an out-turned flange 88 extending the full length thereof. It will be understood, of course, by viewing FIGURES 1–3 in particular, that the aeration unit 78 is mounted in the trough 48, extending over the bottom wall 52 substantially the full length of the tank portion illustrated in FIGURE 1.

The bottom wall 86 of channel 80 has a circular opening therein of substantially the same diameter as the outer diameter of ring 76. A bracket member 90 of inverted U-shape, substantially similar to bracket 72 described above, is mounted on the bottom wall 86 over the opening, as, for example, by being welded thereon. The ring 76 is in turn welded to the inner edge of this opening or to the legs of the bracket 90. A threaded fastener such as bolt 92 extends through an opening in bracket 90, and through the annular ring 76 to be threadedly received in a nut 94 welded beneath an opening in bracket 72. An annular sealing gasket 96 of suitable non-permeable resilient material is mounted over the ring 76 and between the bottom walls 86 and 52 to insure against possible leakage of compressed air from plenum chamber 67 directly into trough 48 or of pulverulent material into the enclosure 66. The gasket 96 preferably has an inner diameter smaller than the outer diameter of ring 76, so that it can be slipped over ring 76 and not fall off during installation.

The aeration unit 78 is completed by a cover 98 of suitable air-previous material, any number of which are well-known to those skilled in the art. The pad is mounted over the open top 100 of channel 80, whereby the channel 80 constitutes an air plenum chamber extending through the trough 48 for aerating the material in the tank which normally falls by gravity into the trough. The fabric 98 is mounted on the outstanding flanges 88 of side walls 82 and 84 and is retained thereon by a flat bar 102 with bolts 104 extending through the flat bar, pad and flanges. As will be observed in FIGURES 4 and 5, the fabric 98 overlies and contacts the top of the bracket 90. A washer 106 is installed between the head of bolt 92 and fabric 98 to further retain the fabric in place.

It will now be seen that the aeration unit 78 is secured in position in the tank by means of the bolt 92, which is accessible from the inside of the tank for both mounting and demounting purposes. Thus the aeration unit is readily replaced by simply entering the tank through a conventional manhole. The threads of the bolt 92 and the nut 94 are in a pulverulent material-free area, a seal around the air inlet is easily provided and maintained, and overall construction is simple and relatively economical. In case of thread failure in the nut 94, the U-shaped strap 72 is removed by breaking the weak weld 74 and removing the strap through the element 76. A new nut can then be welded in position and the same or a new strap 72 weak welded at 74 from inside the tank.

It is desirable to direct air (or gas) directly into the aeration unit 78 instead of pressurizing the entire area beneath the unit and behind the slope sheets 38 and 40. Even though the pressure difference across the structure amounts to only 2½ to 3½ p.s.i., the flat surfaces are very large, so that the total force involved is also large and heavy and expensive construction is then required. By forming a pressure-tight enclosure such as 66, and providing an air duct such as 64, pumping air is conveyed directly into and through the aerating unit and into the material compartment 54 of the tank, without subjecting the slope sheets to excessive stresses.

Referring again to the arrangement of FIGURES 1 and 2, it will be appreciated that the chambers 56 and 57 below the slope sheets are normally at a substantially lower pressure than the chamber 54, as the air flowing through aeration unit 78 to aerate the the material in the tank normally builds up pressure in chamber 54 before the material is discharged from the tank. To avoid this, pressure-equalizing means in the form of a conduit 108 is mounted through slope sheet 42, which forms part of the material-supporting bed of the tank, for communicating the lower chambers with the upper chamber 54. The conduit 108 is supported by bracket 110 mounted on tank wall 34, and opens at a point above the high level of material in chamber 54 in order to equalize the pressure between chambers 54 and 56 and thus avoid the necessity of strengthening slope sheets 38, 40 and 42 to withstand such pressure differential between the chambers.

Figure 7:
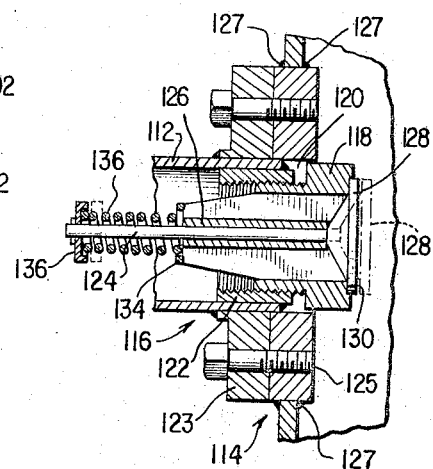
FIGURE 7 is a partial vertical sectional view taken substantially on the plane of line 7—7 of FIGURE 6.

Referring now to FIGURES 6 and 7, it will be obobserved that a bypass conduit 12 communicates with air inlet conduit 58 outside the tank wall 36. The bypass conduit 112 extends into engagement with tank wall 36 at a point beneath the upper edge of the slope sheet, as indicated by reference numeral 114. A normally closed pressure-relief valve, generally denoted by reference numeral 116, is mounted in the end of the conduit. The relief valve 116 is provided for communication with air inlet conduit 58 in order to control the pressure and quantity of the air pumped into the aeration unit 78. The maximum desirable air pressure of the air supply to the aeration unit 78 is generally between 2½ and 3½ p.s.i., and thus the pressure-release valve is set at a back pressure within this limit. The valve, as stated above, is normally closed, and, upon air flowing into conduit 58 at a pressure greater than that at which valve 116 is set to open, the valve will open and allow the excess air to bleed off underneath the slope sheets which communicate with the space above the slope sheets through the bypass conduit 108 (see FIGURES 1 and 2). The conduit 58 contains a flange coupling 59 to provide removability.

Valve 116 includes an externally threaded casing 118 removably mounted in the threaded collar 122 welded in the end of conduit 112 at 120, which in turn is mounted in the wall 36 of the tank 32. The conduit 112 is welded to the bore of a pipe flange 123 which is bolted or otherwise secured to a flange 125 welded to the tank wall 36 at 127. A valve stem 124 extends through a bore 126 in casing 118, the stem being slidable longitudinally in the bore. The valve stem 124 has mounted on the outboard end thereof valve head 128. A valve seat 130 is provided in the casing 118 in which the valve head 128 is normally retained by a compression coil spring 132 to thereby close the conduit 112. The coil spring 132 is seated against the rear shoulder 134 of casing 118 at one end, and at the other end is retained in compressed condition by the spring locking member 136 which is mounted on the inboard end of stem 124. Thus it will be apparent that spring 132 acts to hold valve head 128 on the seat 130 until the air pressure in conduit 112 exceeds the predetermined limit, at which time the valve head will be forced by the air pressure to the position shown in broken lines in FIGURE 7, thereby opening the end of conduit 112.

Referring again to FIGURES 1 and 2, a discharge conduit 138 is observed, the conduit 138 opening at 140 to the lowermost point in the material supporting bed. Since the material in tank 32 has been fluidized by aeration due to aeration unit 78, the material will flow to point 140 and will, of course, be under pressure due to the air discharged through aeration pad 98 into chamber 54. When a sufficient pressure level is reached in chamber 54, as may be determined in a conventional manner, the valve 142 is opened and the fluidized material flows out of the conduit 138. In order to enable the operator to control the density of flow of material through conduit 138, an air conduit 144 is connected to conduit 138 at point 146, the other end of conduit 144 being mounted by bracket 148 and opening in the upper portion of chamber 54. A valve 150 is mounted in conduit 144. As a result of this arrangement, the operator can regulate the density of material flow through discharge conduit 138 by regulating the valve 150 to admit more or less air into the conduit 138 and thus control the mixture or density of the material. This determines line pressure and resistance and pumping pressure. Maximum pumping rate is obtained by maintaining maximum pumping pressure. A major advantage of this system is that, even with a long discharge line, flow can be interrupted long enough for the material to completely settle out and plug the line, and by opening valve 150, while keeping valve 142 closed, flow can be started again.

The invention may be embodied in other specific forms without departing from the spirit or essential characteristics thereof. The present embodiments are therefore to be considered in all respect as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:

1. In a pumping tank for pulverulent material including a bottom wall therein the improvement comprising: a plenum chamber fixedly mounted on the underside of the bottom wall, conduit means connected to said plenum chamber for delivering air thereto, an aperture in the bottom wall opening to said plenum chamber, an air-permeable-material type aeration unit removably mounted on the upper side of the bottom wall, said aeration unit having a rigid lower portion forming a chamber beneath said air-permeable material, said chamber being in fluid-tight communication with said aperture for receiving air from said plenum chamber, and means holding said aeration unit in position, said holding means being actuatable from within said tank so that said aeration means may be secured in position and released from within said tank.

2. The device of claim 1 wherein said holding means includes bracket means mounted on the underside of the bottom wall and extending into the plenum chamber, elongate fastening means removably mounted in the bracket means and extending through the aperture and through said aeration unit, said fastening means removably mounting said aeration unit on said bottom wall.

3. The device of claim 2 wherein said bracket means comprises a substantially U-shaped member mounted on said bottom wall and having internal thread means in the bight thereof, and said elongate fastening means comprises a bolt screw threadedly engaging the U-shaped member for mounting said aeration unit.

4. The device of claim 3 including second bracket means mounted on the upper surface of the bottom of said rigid lower portion of the aeration unit, said bolt passing through said airpermeable material and through said second bracket means to screw-threadedly engage said internal thread means.

5. The device of claim 4 including an annular ring member extending removably through said aperture in the bottom wall and fastened to the rigid lower portion of the aeration unit, said ring member extending into said lower portion of aeration unit and into said plenum chamber, and a tightly fitting, flexible washer about said annular ring member and in engagement with said bottom wall and the lower surface of the bottom of the lower portion of the aeration chamber.

6. The device of claim 2 wherein said bracket means may be removed and replaced from within said tank.

7. The device of claim 1 wherein the conduit means includes means for maintaining the differential pressure of air flowing through the plenum chamber within a predetermined maximum limit, said last-named means including a pressure-relief valve connected between said conduit means and the upper portion of the tank.

8. The device of claim 7 including slope sheets diagonally mounted in said tank and having lower edges terminating near the bottom thereof adjacent said aeration unit, said pressure-relief valve being connected between said conduit means and the space beneath at least one of said slope sheets, said space being in communication with the space above said slope sheet.

9. The device of claim 1 including a pulverulent material discharge conduit extending into the lower portion of said tank immediately above said aeration unit, a valve in said discharge conduit, and an air conduit connected to said pulverulent material discharge conduit on the side of said valve away from said tank, and extending into and in communication with the upper portion of the interior of said tank, and a valve in said last-named conduit.

References Cited
UNITED STATES PATENTS

| | | | |
|---|---|---|---|
| 2,524,919 | 10/1950 | Meincke | 302—53 |
| 2,915,340 | 12/1959 | Lusted | 302—53 |
| 2,924,489 | 2/1960 | Beckman | 302—53 |
| 3,179,378 | 4/1965 | Zenz et al. | 302—53 |
| 3,208,799 | 9/1965 | Rivers | 302—17 |

ANDRES H. NIELSEN, *Primary Examiner.*

UNITED STATES PATENT OFFICE
CERTIFICATE OF CORRECTION

Patent No. 3,337,272　　　　　　　　　　　August 22, 1967

James A. Page

It is hereby certified that error appears in the above numbered patent requiring correction and that the said Letters Patent should read as corrected below.

Column 3, line 57, for "shealed" read -- sealed --; column 5, line 26, strike out "ob-"; line 27, for "12" read -- 112 --.

Signed and sealed this 2nd day of July 1968.

(SEAL)
Attest:

Edward M. Fletcher, Jr.　　　　　　　　　　EDWARD J. BRENNER
Attesting Officer　　　　　　　　　　　　　Commissioner of Patents